US010697820B2

(12) United States Patent
Patel et al.

(10) Patent No.: US 10,697,820 B2
(45) Date of Patent: Jun. 30, 2020

(54) SELF-CALIBRATING BASE STATION FOR OFFSET MEASUREMENTS

(71) Applicant: Saudi Arabian Oil Company, Dhahran (SA)

(72) Inventors: Sahejad Patel, Thuwal (SA); Brian Parrott, Thuwal (SA); Abdullah Arab, Thuwal (SA); Fadl Abdellatif, Thuwal (SA); Pablo Carrasco Zanini, Barcelona (ES)

(73) Assignee: Saudi Arabian Oil Company, Dhahran (SA)

( * ) Notice: Subject to any disclaimer, the term of this patent is extended or adjusted under 35 U.S.C. 154(b) by 230 days.

(21) Appl. No.: 15/969,235

(22) Filed: May 2, 2018

(65) Prior Publication Data

US 2019/0242742 A1 Aug. 8, 2019

Related U.S. Application Data

(60) Provisional application No. 62/626,866, filed on Feb. 6, 2018.

(51) Int. Cl.
*G01F 25/00* (2006.01)
*G01F 17/00* (2006.01)
(Continued)

(52) U.S. Cl.
CPC ........ *G01F 25/0061* (2013.01); *F17C 13/028* (2013.01); *G01B 5/0021* (2013.01);
(Continued)

(58) Field of Classification Search
CPC .......... G01F 17/00; G01F 23/14; G01F 22/02; G01F 25/0061; G01F 23/266;
(Continued)

(56) References Cited

U.S. PATENT DOCUMENTS

| 4,502,224 A | 3/1985 | Davies et al. |
| 4,747,454 A * | 5/1988 | Perryman ............ G01B 11/272 |
| | | 166/380 |

(Continued)

FOREIGN PATENT DOCUMENTS

| CN | 1164913 C | 9/2004 |
| CN | 102128578 A | 7/2011 |

(Continued)

OTHER PUBLICATIONS

Sivaraman, Srini, and Sk Japan. "Vertical cylindrical storage tank calibration technologies and application." Proceedings of API Conference & Expo, Singapore. 2012.

(Continued)

*Primary Examiner* — John Fitzgerald
*Assistant Examiner* — Truong D Phan
(74) *Attorney, Agent, or Firm* — Leason Ellis LLP

(57) ABSTRACT

A self-calibrating system, apparatus, and method for accurately measuring a volumetric capacity of a tank. The system, apparatus and method comprise: a mechanism that adjusts a level of a platform; a light-emitting device with beam-like optics (laser, diode, etc.) mounted to the platform; mechanism for adjusting alignment of the light-emitting device with respect to the platform; a mechanism for rotating the platform by variable angles, including by 180-degrees; one or more level sensors (such as, for example, spirit levels, tilt sensors, or other devices) that provide feedback on the alignment of the platform normal to the gravity vector.

20 Claims, 7 Drawing Sheets

(51) Int. Cl.
*F17C 13/02* (2006.01)
*G01C 15/00* (2006.01)
*G01B 5/00* (2006.01)
*G01B 5/02* (2006.01)
*G01B 11/24* (2006.01)
*F17C 3/00* (2006.01)

(52) U.S. Cl.
CPC .............. *G01B 5/025* (2013.01); *G01B 11/24* (2013.01); *G01C 15/006* (2013.01); *G01F 17/00* (2013.01); *G01F 25/0084* (2013.01); F17C 3/00 (2013.01); F17C 2250/0426 (2013.01)

(58) Field of Classification Search
CPC .. G01F 25/0084; G01D 11/30; G01D 11/245; G21C 17/0017; B60N 2/505; B60N 2/502; B60N 2/525; G01B 11/026; G01B 11/002; G01B 11/14; G01B 11/26; G01B 11/27; G01B 3/14; G01B 5/00; G01B 21/042; G01N 21/53; G01N 21/51; G01N 21/532; G01N 15/0205; G01C 15/004; G01C 15/002; G01L 27/00; F16H 59/72; F16H 61/0251; B25J 9/1692; B82Y 35/00
USPC .... 73/149, 866.5, 1.63, 1.73, 1.79; 248/550; 356/614, 339, 340, 138; 33/286, 1 V
See application file for complete search history.

(56) References Cited

U.S. PATENT DOCUMENTS

| | | | | |
|---|---|---|---|---|
| 5,237,855 | A * | 8/1993 | Gates ...................... | G01M 3/10 73/41.4 |
| 5,263,361 | A * | 11/1993 | Gates ...................... | G01M 3/10 73/41.4 |
| 5,689,330 | A | 11/1997 | Gerard et al. | |
| 5,809,099 | A * | 9/1998 | Kim ...................... | G05D 1/0236 376/249 |
| 6,584,379 | B1 * | 6/2003 | Mukai ................... | B25J 9/1638 336/130 |
| 6,994,305 | B2 * | 2/2006 | Schenk, Jr. .......... | B25B 11/002 248/205.1 |
| 7,800,758 | B1 * | 9/2010 | Bridges ................ | G01B 11/002 356/482 |
| 9,188,472 | B2 * | 11/2015 | Hassell, Jr. ............. | G01F 17/00 |
| 10,379,219 | B1 * | 8/2019 | Nazarian ................ | G01B 17/00 |
| 10,475,203 | B2 * | 11/2019 | Parrott ................... | G01C 15/00 |
| 2004/0083615 | A1 * | 5/2004 | Cotner ................. | G01C 15/008 33/288 |
| 2004/0187327 | A1 * | 9/2004 | Levine ................... | G01B 11/26 33/286 |
| 2004/0255477 | A1 * | 12/2004 | Levine ................. | G01C 15/004 33/286 |
| 2005/0005462 | A1 | 1/2005 | Heger et al. | |
| 2005/0117153 | A1 | 6/2005 | Kishi et al. | |
| 2008/0120853 | A1 | 5/2008 | Munroe et al. | |
| 2009/0303208 | A1 | 12/2009 | Case, Jr. et al. | |
| 2010/0085578 | A1 | 4/2010 | Weiss et al. | |
| 2010/0122466 | A1 * | 5/2010 | Hemingway ........ | G01C 15/004 33/228 |
| 2010/0276554 | A1 * | 11/2010 | Steffen ................... | G01D 11/30 248/206.5 |
| 2011/0081978 | A1 * | 4/2011 | Murdock ........... | A63B 24/0021 473/191 |
| 2012/0185092 | A1 * | 7/2012 | Ku ......................... | B25J 13/088 700/258 |
| 2014/0345375 | A1 * | 11/2014 | Hassell, Jr. ............. | G01F 17/00 73/149 |
| 2015/0001368 | A1 | 1/2015 | Sprenger et al. | |
| 2015/0146216 | A1 * | 5/2015 | Krauhausen ........... | B21C 51/00 356/612 |
| 2016/0143270 | A1 * | 5/2016 | Schryver ................ | H01S 5/022 220/560.04 |
| 2016/0320179 | A1 * | 11/2016 | Balzano ................ | B23K 26/042 |

FOREIGN PATENT DOCUMENTS

| | | |
|---|---|---|
| CN | 202133430 U | 2/2012 |
| KR | 100501349 * | 6/1999 |

OTHER PUBLICATIONS

International Preliminary Report on Patentability in corresponding PCT Application No. PCT/US2019/015070, dated Feb. 28, 2020. 16 pages.

* cited by examiner

SELF-CALIBRATING BASE STATION FOR OFFSET MEASUREMENTS

CROSS-REFERENCE TO RELATED PATENT APPLICATIONS

This application claims priority to and the benefit thereof from U.S. Patent Application No. 62/626,866, filed Feb. 6, 2018, titled "SELF-CALIBRATING BASE STATION FOR OFFSET MEASUREMENTS," the entirety of which is hereby incorporated herein by reference.

FIELD OF THE DISCLOSURE

The present disclosure relates generally to calibration of storage tanks, and, more particularly, to calibration of storage tanks used to store and measure amounts of petroleum product stored in the tanks.

BACKGROUND OF THE DISCLOSURE

Storage tanks are commonly used to store various types of petroleum products. The storage tanks can range in volume capacity from a few thousand cubic meters to hundreds of thousands (or more) of cubic meters. Since the storage capacity of such tanks is known before hand, the tanks are frequently used to measure the amount of petroleum product held in the tanks. However, the volume capacity of such tanks does not remain fixed, but changes with the amount of product placed in the tanks, as well as other factors that affect volume capacity, such as, for example, tank geometry, material used for the walls of the tanks, ambient temperature, and ambient pressure, among other things. Therefore, it is common practice to calibrate storage tanks in order to determine accurate volumetric capacity and, resultantly, accurately determine the amount of petroleum product (e.g., oil or gas) in the tanks.

There exist a number of methods of calibrating or measuring the volume of large storage tanks. For instance, one known method is to fill a tank and then measure the amount of liquid drained from the tank. This method, however, is very time consuming, and can be very costly for large size tanks. Normally, this method is avoided unless the tank volume cannot be determined geometrically through physical measurement of the tank parameters.

Another method for calibrating tanks is called the optical reference line method (ORLM). The ORLM provides for the calibration of cylindrical tanks by measurement of one reference circumference, followed by determining the remaining circumferences at different elevation levels on the tank. The remaining circumferences are determined by measuring the horizontal offset of the tank wall from a vertical optical reference line. These circumferences are corrected, based on wall thickness, to calculate true internal circumferences, which can then be added to determine the tank volume.

An example of an ORLM method is shown in FIG. 1, in which there is shown a tank 2, a magnetic trolley 4, an optical device 6, and a horizontal graduated scale 8 attached to the trolley 4. During operation, the optical device 6 produces an optical ray beam 10 upwardly and parallel to the tank wall 12. The magnetic trolley 4 is typically controlled by an operator 11 positioned on top of the tank 2, who holds a rope 13 attached to the trolley 4. The operator 11 pulls or releases the rope 13 to move the trolley 4 up or down along the tank wall 12.

In order to determine volume, a reference circumference C is initially measured along the perimeter of the tank 2. The reference circumference C is measured using a measuring tape (not shown), and is typically measured near the bottom of the tank 2. With the reference circumference C known, the trolley 4 can be raised or lowered by the rope 13 to various vertical stations V along the tank wall 12. In most systems, the vertical stations V are located between the weld seams on the tank 2. In FIG. 1, two of the vertical stations are indicated by lines V. At each vertical station V, the horizontal offset between the tank wall 12 and the optical ray beam is noted using the horizontal graduated scale 8.

Once a series of measurements have been taken at the vertical stations V, the measurements are repeated with the optical device 6 rotated 180-degrees to verify accuracy. Thereafter, the measurements are used to determine the circumference of the tank at each vertical station V (using the reference circumference as a reference point), and the volume of the tank 2. Additional factors can also be considered when calculating volume, such as, for example, the temperature of the tank walls 12. This temperature is typically derived based on the temperature inside the tank and the ambient temperature.

While the ORLM method shown in FIG. 1 is better in some ways than filling the tank 2 and measuring the fluid drained from the tank 2 to determine volume, as discussed above, it has significant drawbacks. For example, measuring the horizontal offset of the trolley 4 from the optical ray beam 10 at only a few select vertical stations V provides relatively few data points from which tank circumferences can be measured. Although this data can be extrapolated to estimate the volume of the tank 2, such extrapolations tend to be inaccurate. Additionally, the ORLM method shown in FIG. 1 requires the operator 11 to be positioned on the top of the tank, which can be dangerous. Furthermore, the use of the optical ray beam 10 and a horizontal graduated scale 8 to measure the horizontal offset of the tank wall 12 lacks the precision necessary to calculate accurate tank volumes. This is because an operator must read the horizontal graduated scale 8 at each horizontal offset, often from a distance.

To overcome drawbacks related to the operator having to read the horizontal graduated scale 8 at each horizontal offset, it is known to replace the horizontal graduated scale 8 on the trolley 4 with a linear position sensor that accurately senses the location where the optical ray beam 10 impinges on the linear position sensor, and, thereby, facilitates accurate determination of the circumference of the tank wall 12 at the measurement location (e.g., vertical station V). Such linear position sensors, however, fail to sense the optical ray beams 10 where significant drift occurs between the optical device 6 and the trolley 4, such as, for example, due to irregularities or deformations in the tank wall 12. When this happens, horizontal offset measurements cannot be made at such measurement locations, and the inaccuracies introduced into the volumetric capacity calculations by the missing measurements can be great enough to render the ORLM calibration method unreliable.

There exists an unfulfilled need for an apparatus, a system and a method that provides self-calibration for offset measurements and that overcomes the disadvantages of known systems.

SUMMARY OF THE DISCLOSURE

According to an aspect of the disclosure, a self-calibrating system is provided that comprises: a mechanism that adjusts a level of a platform; a light-emitting device with beam-like optics (laser, diode, etc.) mounted to the platform; a mechanism for adjusting alignment of the light-emitting device with respect to the platform; a mechanism for rotating the platform by variable angles, including by 180-degrees; and one or more level sensors (such as, for example, spirit levels, tilt sensors, or other devices) that provide feedback on the alignment of the platform normal to the gravity vector.

The level sensor may be mounted perfectly parallel with the surface of the platform.

The mechanisms for adjusting level, alignment, or rotation can be actuated. The actuation can be accomplished through motors, electroactive materials, magnetics, or other forms of force producing devices and/or systems including gearing, etc.

The base station can have a microcontroller to read information from the onboard sensors (or other sources of information) and potentially process adjustments if the base station is actuated. Rather than actuating the base station completely, by recording tilt or misalignment of the optics, the data could be mathematically corrected/compensated rather than actively/physically moving (correcting) the base station alignment. This could simplify the mechanical system.

The base station can have a means of communicating with an intelligent sensor that is receiving the reference beam in order to gain additional information for adjusting alignment of the light or platform. The communication can be wireless or wired.

The base station can have a means of communicating with the operator control/monitoring device through wired or wireless means.

The base station and/or sensor can mount to a surface using magnetics. The base station could mount/rest on the surface being measured (e.g., tank wall) or another surface (e.g., floor/ground). Magnetics are optional.

The base station and/or sensor can be actuated to move along the surface being inspected/measured.

The base station can have multiple light emitting devices and interface with multiple sensors simultaneously.

The sensors and/or base station can report information back to the operator.

The base station can have GPS or some other form of localization sensor to record the absolute/geological coordinates of measurement.

The base station can emit a complete 360 degree "plane" in a horizontal or vertical direction that could be received by multiple sensors simultaneously. This may be useful for calibrating the offsets of the floor of a tank, or other larger surfaces that need to be level.

The sensors can include a type of localization technology in order to capture their relative positions.

According to another aspect of the disclosure, a self-calibration method is provided that aligns a base station with a sensor, wherein the method comprises: placing the base station on a surface; ensuring that the base station platform is level with respect to gravity (technically, there are at least two meanings to this—it can be pointed vertically or horizontally, but gravity is the reference that it uses); placing the sensor on another surface at some distance and directly above/in front (in the path of the light emitting device) of the base station; rotating the platform of the device; ensuring that the levelness of the platform is retained and, if not, adjust the platform to split the difference in this error and repeat the earlier step(s) (this might occur if the sensor is not mounted perfectly parallel to the platform); ensuring (by way of communicating with the sensing device) that the position at which the light hits the sensor does not change with rotation; and, adjusting the alignment of the light emitting device by halving the change until the platform can be rotated without the light changing location on the sensor (repeating foregoing steps).

The entire process of aligning the base station and sensor could be automated to various degrees. Placement of the sensor device can also be automated.

Using a well-known and calibrated device at a known distance, the alignment can be verified by measuring the width of the dot or line as it hits the sensing device. If it is larger than it ought to be, it may mean that there is an angular misalignment between the plane containing the sensor and the direction the light is being emitted. This could arise from errors in the base station alignment or via the sensor itself not being parallel with the ground (normal to gravity vector).

The sensor could be actuated to ensure that the thinnest reference beam line is always maintained via rotation of the sensor with respect to the surface it is resting on/attached to (thereby overcoming potential misalignment caused by the sensor). This can be aided by tilt sensors, accelerometers, or other sensors on the sensor board.

Alternatively, if the error is coming from misalignment of the base station, the base station can utilize this information in attempting to align itself, possibly using multiple sensors which all have the potential for some error to choose the alignment setting that minimizes the error proportional to the accuracy and reliability of the available inputs.

The sensor could be actively actuated in one or two degrees of freedom (roll & pitch) to ensure that is level with respect to gravity. A tilt sensor, accelerometers or an inertial measurement unit could be used as feedback to implement the active leveling.

The light emitting device can emit a line or a cross (as seen on the surface it is hitting), with at least one line being parallel to the surface. The other being vertical with respect to the surface.

The placement of the sensor device could occur automatically if it is actuated to move along the surface and is already on the desired surface by using some means of detecting its location relative to the base station and moving into a desired position above said base station.

The primary mode of motion can be vertical, i.e. in line with the laser such that the sensor/vehicle captures multiple readings as it moves up the surface.

This could be coupled to movement that the base station performs in order to move to a new location or rotate on the surface. For example, if the base station moves to the right by a specific distance, the sensing device could receive a command to do likewise until it detected the light and/or accomplished the desired movement.

This could be part of a pre-programmed set of instructions for performing a series of measurements that is repeated.

These repeated measurements could be modifiable to adjust to different specific cases, such as the number of stations for a given sized tank, along with the distances need to move between each station, etc.

If the sensing device has multiple sensors at different distances, alignment of the light source with respect to these can be accomplished by noting differences in where the light is hitting each sensor and adjusting either the sensor or base station to ensure that the light hits each of these sensors at the same location (assuming that they are all offset from the surface by the same amount). Determining whether to adjust the sensors orientation or the base station orientation would require analysis of additional data.

The system could utilize an external tracking system to track the location of the sensor/vehicle in 3D space. The tracking system can include, for example, a lidar-based tracker, or the like. This may provide a location tag for every offset measurement in 3D space, which could aid the analysis of the data, as well as the alignment of the base station and vehicle.

The system could have more than one light emitting source (laser, diode, etc.). They could be setup in various configurations are needed for the application. For example: two parallel laser lines can be used to acquire more information from the sensing device.

A system could have a temperature sensor or other environmental sensors to assist in calibration/compensation of the system due to environmental conditions.

Additional features, advantages, and embodiments of the disclosure may be set forth or apparent from consideration of the detailed description, drawings and attachment. Moreover, it is to be understood that the foregoing summary of the disclosure and the following detailed description, drawings and attachment are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

Figure 1:
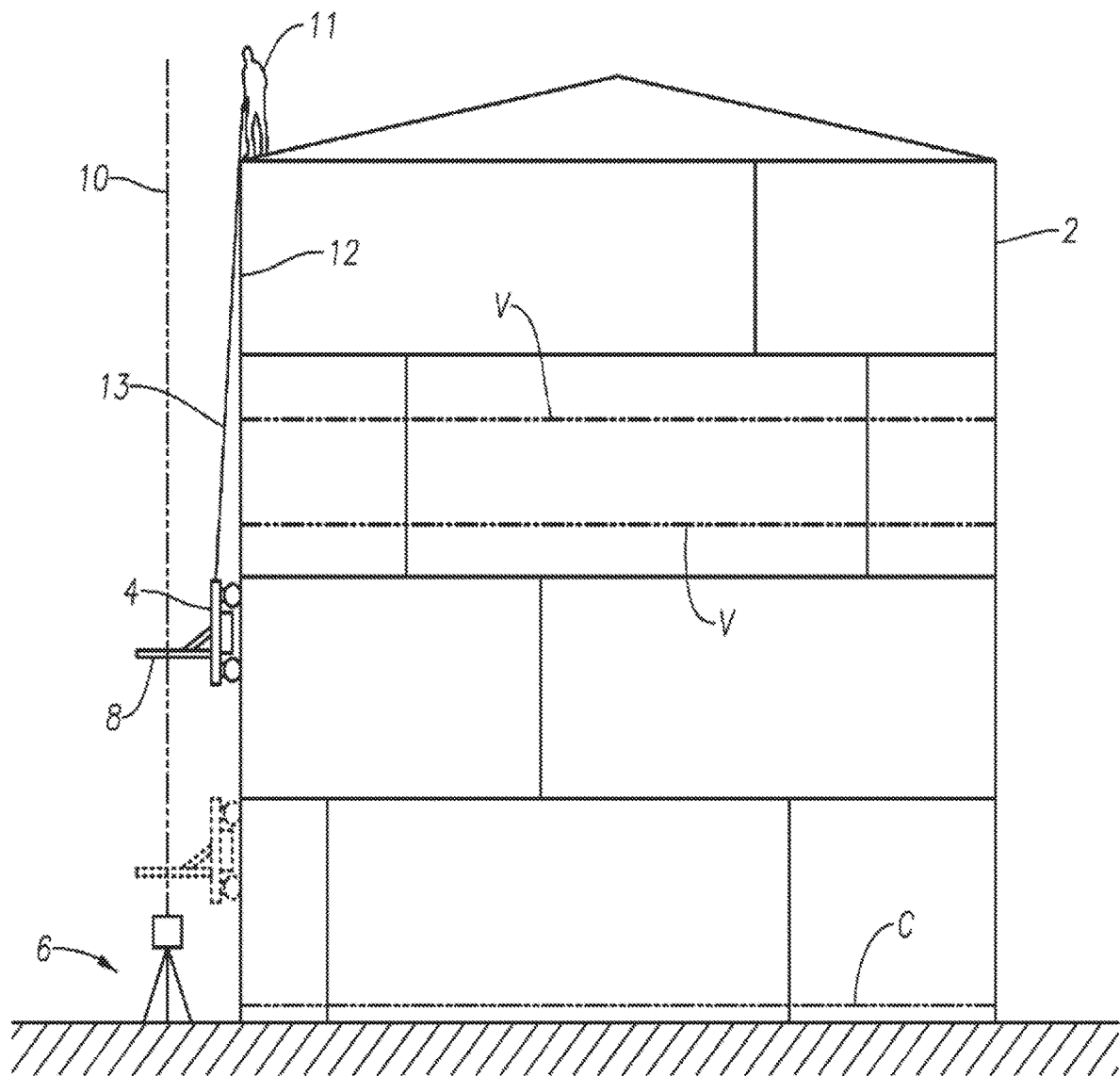
FIG. 1 shows an example of a known system for carrying out the optical reference line method of tank calibration.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment can be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Figure 2:
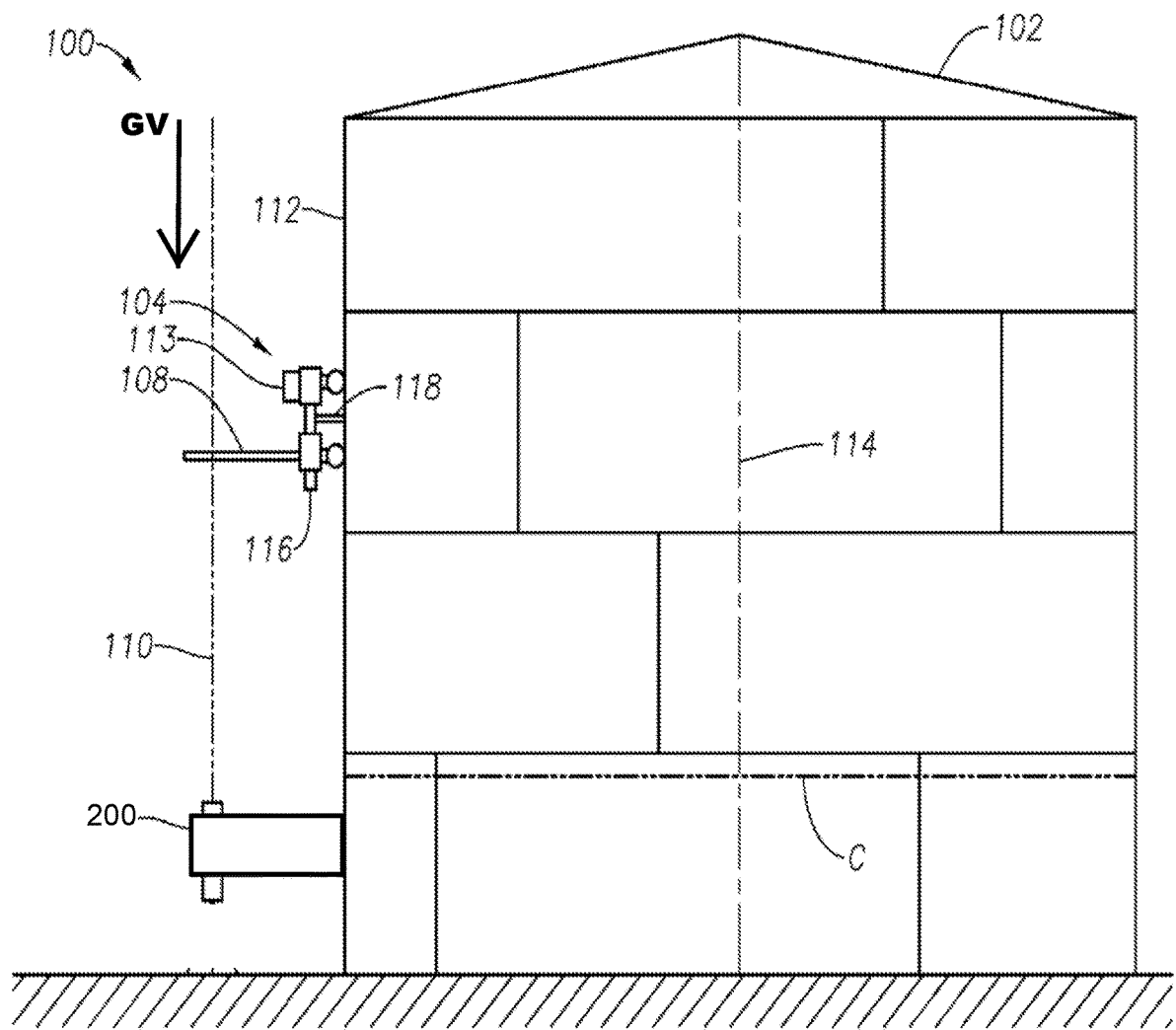
FIG. 2 shows a tank calibration system according to an embodiment of the instant disclosure.

FIG. 2 shows a schematic representation of a tank calibration system 100, according to a non-limiting embodiment of the instant disclosure. The tank calibration (or "TC") system 100 measures the volumetric capacity of a tank that includes a tank 102, a trolley 104, and a base station 200.

The trolley 104 includes a position sensor 108 that senses a reference beam 110 generated by the base station 200. The trolley 104 can include an elevation sensor 116 and/or a temperature sensor 118. The trolley 104 can include a trolley computer 113. The elevation sensor 116 can sense and determine the distance between the position sensor 108 and ground. The temperature sensor 118 can sense and determine the temperature proximate the tank wall 112. The trolley computer 113 can be configured to control all operations of the trolley 104, which can include a robot (not shown), including controlling and operating components of the trolley 104, including driving and navigating the trolley 104 with respect to the tank wall 112, and controlling all communication between the trolley 104 and base station 200, including transmitting and receiving sensor signals, data signals, and control signals over one or more communication links between the trolley 104 and base station 200.

The trolley 104 can be magnetic, motorized, remote controlled, robotic, self-driving and navigating, or autonomous. Where the trolley 104 is magnetic, the magnetism of the trolley 104 can allow it to remain engaged with the tank wall 112, which can be made of steel or other ferrous material, throughout the process of measuring the contour of the tank wall 112. This ability to remain engaged with the tank wall 112 throughout the measuring process ensures that the horizontal distance measurements between the trolley 104 and the reference beam 110 are accurate.

Embodiments of the invention can be used with tanks made of non-ferrous materials, such as, for example, plastics (e.g., high density polyethylene (HDPE)) or fiberglass. In such applications, the trolley 104 can be equipped with suction cups (not shown) or other tank-attachment mechanisms (not shown) without departing from the scope or spirit of the instant disclosure. Alternatively, the trolley 104 can include the trolley 4 shown in FIG. 1.

The position sensor 108 can comprise, for example, a linear sensor, a two-dimensional (2D) array sensor, a three-dimensional (3D) array sensor having two or more sensory planes, or the like. The position sensor 108 can include a charge-coupled device (CCD), a solid-state device, a complementary metal-oxide-semiconductor (CMOS) sensor, an electro-optical sensor, an infra-red sensor, a light emitting diode (LED) sensor, a photodetector, a photodiode, a phototransistor, and the like. The position sensor 108 can include an intelligent sensor having a computer (not shown) that includes a computer-executable artificial intelligence (AI) platform which implements a program configured to process information from the sensors and output position information usable to identify the location of the trolley 104, its orientation, or both location and orientation. As will be appreciated, a given position sensor 108 can include one or all of the foregoing, and any computer can be embedded in the sensor or can comprise the trolley computer 113, connectable to one or more sensors in a conventional manner.

The base station 200 generates and emits the reference beam 110, which can be oriented substantially parallel to the gravity vector GV and/or the tank wall 112, as seen in FIG. 2. The base station 200 can be affixed to the tank wall 112 (as seen in FIG. 2) or mounted to a support (e.g., tripod shown in FIG. 1).

The base station 200 includes a beam source 210 (shown in FIGS. 3 and 5-6) that generates and emits the reference beam 110. To measure the volumetric capacity of the tank 102, the circumference of the tank 102 can initially be measured at a predetermined reference location using any appropriate method, including the known methods described above, or using the trolley 104. For example, in FIG. 2, the reference circumference can be determined by measuring the horizontal distance around the circumference of the tank 102 along a line C close to ground. This part of the tank 102 can expand noticeably over time. As per American Petroleum Industry (API) guidelines, by measuring this location, you can recognize an approximate expansion in the tank 102 exceeding a given level, indicating the need for recalibration of the entire tank 102. This location can be measured before each run (or on a semi-regular basis) to provide the reference circumference for the ORLM method. The tank fill level needs to be the same in measurement of this line and measurement from this line at a later point, but it could be that the tank is emptied and re-filled in between—this depends on the accuracy aimed for. The reference circumference C can provide a substantially constant value for the duration of the time it takes to test, assuming that the fluid inside the tank 102 is not changed. Using the measured reference circumference C value at the reference location, the ring radius (or circumference) of the tank 102 at the reference location can be determined using, for example, the series of equations specified in API MPMS Chapter 2.2A Appendix B to correct for the necessary adjustments to the simple geometric relationship of $r=c/2\pi$, where r is the radius, and c is the circumference of the tank 102.

The base station 200 can emit the reference beam 110 vertically, substantially parallel with gravity (i.e., the gravity vector GV). In some embodiments, the distance from the tank wall 112 to the reference beam 110 can be sensed and determined by the position sensor 108 (or the trolley computer 113 or the base station computer 300). Alternatively (and/or additionally), height can be determined using encoders on the vehicle wheels (or trolley 104 wheels). Because the ring radius of the tank 102 at the reference location is known, and the distance from the tank wall 112 to the reference beam 110 is known, the distance from the center 114 of the tank 102 to the reference beam 110 can be calculated. Deducting the thickness of the tank wall 112, the internal tank radius can be determined.

The tank calibration system 100 can be designed similar to the system 100 described in commonly-owned U.S. Pat. No. 9,188,472, titled "Enhanced Reference Line Tank Calibration Method and Apparatus," issued Nov. 17, 2015, the entirety of which is hereby incorporated herein by reference.

In measuring an offset in the tank 102 wall circumference, it is critical that the beam source 210 be optically aligned with the position sensor 108. A slight angular discrepancy between the optical axis of the reference beam 110 and a sensing surface (not shown) of the position sensor 108 can result in significant errors in high accuracy measurements that might be performed over significant distances. Additionally, small changes in material dimensions in the beam source 210 (or the components that hold the beam source 210) due to, for example, ambient conditions (such as, e.g., temperature, wind, pressure, humidity, etc.) can cause misalignment between the optical axis and, therefore, the reference beam 110 and the position sensor 108. Aligning the beam source 210 with respect to the position sensor 108 without the benefit of the instant disclosure would be time consuming, expensive, and could result in damage to the components of these systems if not done properly. In some instances, due to constantly changing conditions, it can be virtually impossible to accomplish by hand. Moreover, without the benefits provided by the instant disclosure, it can be very difficult to keep the beam source 210 aligned with the position sensor 108 in harsh field conditions. The instant disclosure provides a self-calibrating apparatus, system, and method that provide consistently accurate calibration of alignment of the beam source 210, the reference beam 110, and the position sensor 108.

Figure 3:
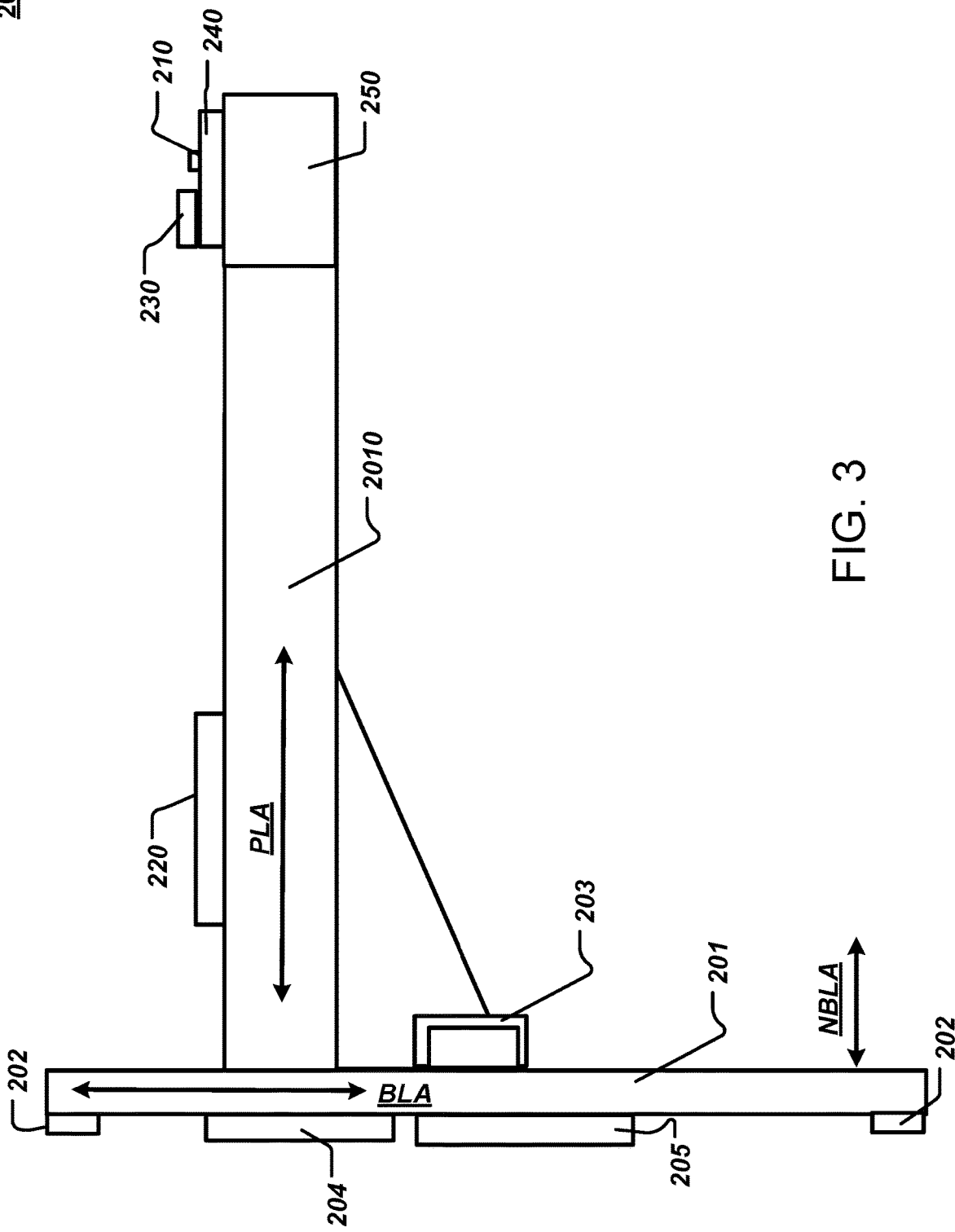
FIG. 3 shows a base station according to an embodiment of the disclosure.

FIG. 3 shows an embodiment of the base station 200 constructed according to the principles of the disclosure. The base station 200 comprises a base 201, a platform 2010, a base level sensor 220, a beam level sensor 230, a beam support base 240, a beam leveling base 250, and the beam source 210. The beam support base 240 and beam leveling base 250 can be formed as a single device or as two or more devices coupled to each other.

The base 201 can include a leg 202 that can be adjustable to adjust the space between a first surface (e.g., back surface) of the base 201 that faces the tank wall 112 and the outer surface of the tank wall 112. The base 201 can be mounted to a robot (not shown), which can attach to and travel along the tank wall 112, in which case the adjustable leg 202 can adjust the space (or distance) between the first surface of the base 201 and a surface on the robot (not shown).

The base 201 can include a plurality of legs 202 (e.g., three legs). One or more of the plurality of legs can be adjustable (as described above) with respect to the surface of the tank wall 112 or the surface of the robot (not shown). The leg(s) 202 can be adjusted so as to align the base 201 in all three dimensions (e.g., x-, y-, and z-axis in the Cartesian coordinate system or r, θ, and φ in the spherical coordinate system) with respect to the gravity vector GV and/or the tank wall 112, such that the base 201 is substantially parallel to the gravity vector GV. In the embodiment shown in FIG. 3, where the platform 2010 is substantially perpendicular to the base 201, the leg(s) 202 can be adjusted such that the platform 2010 (or its longitudinal axis PLA) is substantially normal (or perpendicular) to the gravity vector GV (shown in FIG. 2). Each leg 202 can include an actuator (not shown), which can extend, retract or secure the leg 202 in position with respect to the base 201. It is noted that the platform 2010 does not have to be perpendicular to the base 201, but rather can be configured such that its longitudinal axis PLA forms any angle between 0° and 180° with respect to the longitudinal axis BLA of the base 201.

Figure 4:
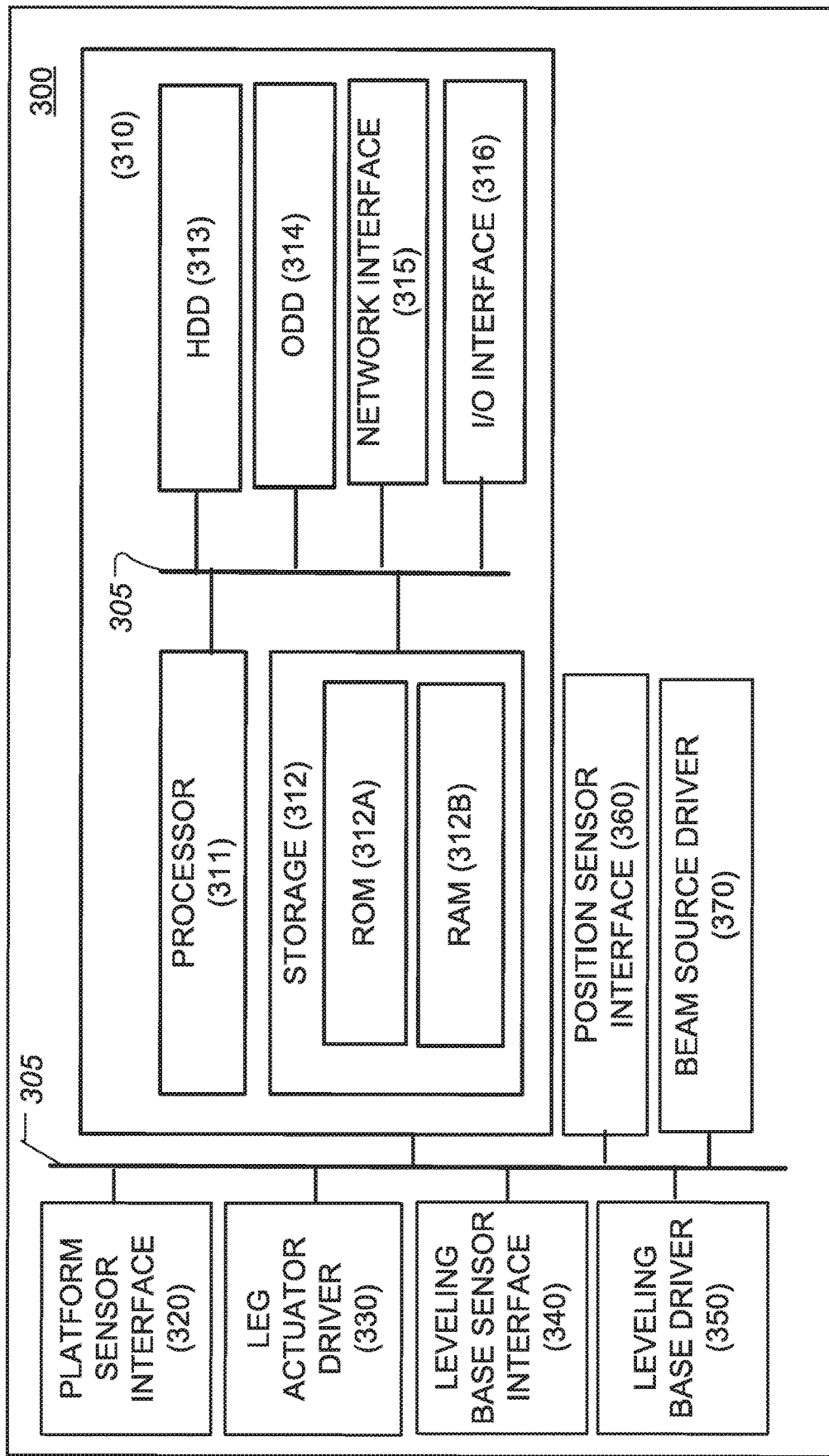
FIG. 4 shows a base station computer according to an embodiment of the disclosure.

The base station 200 can include a base station computer 300 (shown in FIG. 4). The base station computer 300 can be affixed to the base 201 or the platform 2010 or located remotely. The leg actuator(s) (not shown) can be connected to a leg actuator driver 330 in the base station computer 300, which receives position signals (e.g., an x-coordinate signal, a y-coordinate signal, and/or a z-coordinate signal) relative to the gravity vector from the base level sensor 220 via leveling base sensor interface 340 and sends actuator control signals from the leg actuator driver 330 to the leg(s) 202 to adjust the leg(s), and thereby adjust the base 201 and/or platform 2010 into alignment. The level sensor 220 can be configured to detect a real-world level position (x, y, z or r, θ, φ) of the platform 2010 with respect to the gravity vector GV and transmits real-time position signals to the base station computer 300 via the leveling base sensor interface 340.

The leg(s) 202 can be made of a durable lightweight material such as, for example, metal, aluminum, carbon fiber, plastic, and/or the like. The leg(s) 202 can be configured to be adjustable by means of a leg adjuster 2021 (shown in FIGS. 4 and 5). The leg adjuster 2021 can include a knob, a handle, or any other device that is capable of controllably extending, retracting or locking the leg(s) 202 with regard to the base 201, so as to properly position and align the base 201 with respect to the tank wall (or robot). The leg(s) 202 can be configured to tilt the base 201 by, for example, about +/−1° for each 6.6 mm of travel. Other leg-travel to base-tilt ratios are contemplated herein, including tilting the base 201 with respect to the tank wall by less or more than 1° based on travel of less or more than 6.6 mm of the leg 202.

The base 201 can include one or more handles 203, which can be made of the same or a different material than the leg(s) 202. The handle(s) 203 can be designed to be easily grasped by each hand of the operator, allowing the operator to carry, maneuver and position the base 201 at a desired location on or proximate to a tank wall 112 or robot (not shown) that may travel along the tank wall 112.

The base 201 can be configured to be rotated about the axis normal to a surface of the tank wall 112 where the base 201 is to be attached, and/or the gravity vector. The base 201 can include a rotational actuator (not shown) that can rotate the base 201 about the axis TNA (shown in FIG. 2) that is normal to the surface of the mounting site of the tank wall 112 and/or the gravity vector GV (shown in FIG. 2). The actuator can rotate the base 201 between 0° and 180°. The actuator can further rotate the base 201 between 180° and 360°. The actuator (not shown) can be communicatively coupled to the computer 300 (shown in FIG. 4), which can drive the actuator (not shown) to align the base 201 and/or the platform 2010 based on the position signals received from the base level sensor 220, which can be received via the platform sensor interface 320 (shown in FIG. 4).

The base 201 can include a rotational actuator (not shown) that is configured to rotate the platform 2010 about the normal axis NBLA of the base 201—that is, the axis that is perpendicular to the longitudinal axis of the base 201 (shown in FIG. 3). The actuator can rotate the platform 2010 between about 0° and about 180° with respect to the base 201. The actuator can further rotate the platform 2010 between 180° and 360°. The platform actuator (not shown) can be communicatively coupled to the computer 300 (shown in FIG. 4), which can drive the platform actuator (not shown) to align the platform 2010 based on the position signals received from the base level sensor 220 via the platform sensor interface 320 (shown in FIG. 4). It is noted that the platform 2010 can be configured to pivot between about 0° and about 180° with respect to the base 201. The base station 200 can be configured such that the platform 2010 is collapsible with respect to the base 201, so that the base station 200 may be collapsed for packing or transport.

The base 201 can include a permanent magnet 204 that secures the base 201 to the metal tank wall 112 or robot (not shown) by means of magnetic force. The base 201 can include a further magnet 205 that further secures the base 201 to the metal tank wall 112 or robot (not shown). The magnet 205 can include an electromagnet that selectively applies a magnetic field to secure the magnet 205 to the tank wall 112 or robot (not shown). The permanent magnet 204 can serve to affix the base 201 to the tank wall 112 (or robot) and temporarily hold the base 201 in position. The magnet 205 can serve to secure the base 201 to the tank wall 112 (or robot), thereby preventing any movement of the base 201 in a plane parallel to the surface plane of the tank wall 112 (or robot), while permitting adjustment of the space (or distance) between the first surface (e.g., back surface) of the base 201 and outer surface of the tank wall 112 (or robot) by means of the leg(s) 202.

The magnet 205 can comprise an electromagnet, a "switchable magnet" (e.g., a permanent magnet having a magnetic flux that can be short-circuited, thus preventing magnetic attraction to the surface), or the like. The magnet 205 can be turned ON/OFF or adjusted by operation of a magnet actuator 2051 (shown in FIG. 4), which can include a handle that can be grasped and manipulated by the operator. The magnetic field generated by the magnet 205 can be turned ON/OFF or adjusted in intensity by operation of the actuator 2051. The magnet 205 can be powered by a power source 270 (shown in FIG. 6), which can include an electrical power store such as a battery.

The magnet 205 can be communicatively coupled to the computer 300 (e.g., via an input/output (I/O) interface 316 shown in FIG. 4), which can control the magnet 205 to automatically turn ON/OFF or adjust the magnetic field generated by the magnet 205.

In lieu of or in addition to the magnet 204 and/or magnet 205, the base station 200 can be positioned on a movable platform (not shown), such as, for example, a robot, a trolley, a vehicle, a stand, a tripod, and the like.

The platform 2010 can be rigidly or movably (e.g., rotationally) affixed to the base 201. Alternatively, the platform 2010 can be integrally formed with the base 201 as a single piece. The beam source 210 can be mounted to the platform 2010 by means of the beam leveling base 250 and/or beam support base 240 to allow for adjustment of alignment of the beam source 210 with respect to the platform 2010. The base level sensor 220 can be attached to or integrally formed with the platform 2010. Alternatively, the base level sensor 220 can be attached to or integrally formed with the base 201. The beam level sensor 230 can be attached to or integrally formed with the beam leveling base 250. Alternatively, the beam level sensor 230 can be attached to the beam support base 240.

The beam source 210 can include a solid-state laser, a gas laser, an excimer laser, a dye laser, a semiconductor laser (e.g., a laser diode), or any device that emits a detectable reference beam 110 that can be detected by the position sensor 108 to determine the position of the base station 200 with respect to the position sensor 108. The beam source 210 can include, for example, a 635 nm Class IIIa laser module with a +/−1.5° fan and a +/−1° steering module. The beam source 210 can be communicatively coupled to a beam source driver 350 in the base station computer 300 (shown in FIG. 4), which can turn ON/OFF or adjust the beam intensity, beam angle, beam spread, and the like, of the reference beam 110.

The beam source 210 can emit a single reference beam 110 as a line or a plurality of beams (e.g., a cross), including, for example, at least one beam parallel to the surface of the tank wall 112 and at least one beam perpendicular to the surface of the tank wall 112. In the case where the beam source 210 emits a plurality of beams, the beams may be setup in various configurations as needed for a given application. For example, two parallel beams can be used to acquire more information from the position sensor 108.

The base level sensor 220 can comprise a three-dimensional (3D or 3-axis) sensor, such as, for example, a spirit vial level, a circular spirit vial level, a spirit level bubble vial, a tilt sensor, a gyroscope, a geomagnetic sensor, a 3-axis accelerometer, or any other device that is capable of providing feedback on the alignment of the platform 2010 in the plane normal to the gravity vector GV in 3D. The base level sensor 220 can be mounted to or formed parallel with the surface of the platform 2010. For instance, the base level sensor 220 can be mounted to a surface of the platform 2010 (e.g., via a magnet (not shown)) or formed integrally with the platform 2010 structure.

The base level sensor 220 can be communicatively coupled to the base station computer 300 via the platform sensor interface 320 to provide sensed position signals to the base station computer 300.

The beam level sensor 230 can comprise a 3D sensor (similar to beam level sensor 220) or one or more two-dimensional (2D) level sensors. The beam level sensor 230 can comprise a dual-axis spirit level, a tilt sensor, or any other device that is capable of providing feedback on the alignment of the normal of the support base 240 (or leveling base 250) to the gravity vector. The sensor 230 can provide 4 arcsec sensitivity. The beam level sensor 230 can be actively actuated in one or two degrees of freedom (roll and pitch) to ensure that it is level with respect to gravity.

The beam level sensor 230 can be communicatively coupled to the processor base station computer 300 via the leveling base sensor interface 340 to provide sensed position signals to the base station computer 300.

The beam leveling base 250 and beam support base 240 can be integrally formed as a single unit or assembled from a plurality of components. The beam support base 240 can be configured to securely and/or fixedly hold the beam source 210 in position with respect to the beam support base 240. The beam support base 240 can be configured to securely and/or fixedly hold the beam level sensor(s) 230 in position with respect to the beam support base 240. The beam support base 240 can be mechanically and/or electrically coupled to the beam leveling base 250.

The beam leveling base 250 can be configured to be adjustable in both the x-y plane and the z-y plane of the real-world coordinate system (x, y, z coordinate system) with respect to the platform 2010. The beam leveling base 250 can include, for example, a dual-axis leveling base that can be manually controlled by an operator or electronically by the base station computer 300 (shown in FIG. 4). The beam leveling base 250 can have a range of movement of about +/−2.5° and 2 arcsec sensitivity.

The beam leveling base 250 can be configured to be adjustable in all three-dimensions (x-, y-, z-dimension or r-, θ-, φ-dimension), including rotational adjustment with respect to the platform 2010. The beam leveling base 250 can be arranged to rotate from 0° to 180° about the longitudinal axis PLA of the platform 2010.

The beam leveling base 250 can include a plurality (e.g., two) of adjustable knobs 2501, 2502 (shown in FIG. 5) to adjust the normal plane of the beam leveling base 250 with respect to the gravity vector GV (shown in FIG. 3). For instance, the knobs 2501, 2502 can be adjusted to center the beam level sensor(s) 230 (e.g., by bringing the bubbles in the spirit vials to the centers of each of the 2D sensors 2301 and 2302, in FIG. 5).

FIG. 4 shows an embodiment of the base station computer 300, constructed according to the principles of the disclosure. The base station computer 300 is configured to implement the various aspects of the disclosure. The base station computer 300 includes a controller 310, the platform sensor interface 320, the leg actuator driver 330, the leveling base sensor interface 340, the leveling base driver 350, a position sensor interface 360, and beam source driver 370, all of which can be communicatively coupled to a bus 305. The system bus 305 can be any of several types of bus structures that can further interconnect to a memory bus (with or without a memory controller), a peripheral bus, and a local bus using any of a variety of commercially available bus architectures.

The controller 310 includes a processor 311. The processor 311 can be any of various commercially available processors. Dual microprocessors and other multi-processor architectures can also be employed as the processor 311.

The controller 310 includes a computer-readable medium that can hold executable or interpretable computer code (or instructions) that, when executed by the processor 311, causes the steps, processes and methods described herein to be carried out. The computer-readable medium can be provided in a storage 312, HDD 313, and/or ODD 314. The computer readable medium can include sections of computer code that, when executed by the processor 311, cause the base station 200 to carry out each of the Steps shown in FIG. 7, as well as all other process steps described or contemplated herein.

The storage 312 includes a read only memory (ROM) 312A and a random access memory (RAM) 312B. A basic input/output system (BIOS) can be stored in the non-volatile memory 312A, which can include, for example, a ROM, an EPROM, an EEPROM, or the like. The BIOS can contain the basic routines that help to transfer information between elements within the controller 310 and, more generally, the base station computer 300 such as during start-up. The RAM 312B can include a high-speed RAM such as static RAM for caching data.

The controller 310 can include an internal hard disk drive (HDD) 313, such as, for example, an enhanced integrated drive electronics (EIDE) drive, a serial advanced technology attachments (SATA) drive, or the like, and an optical disk drive (ODD) 314 (e.g., for reading a CD-ROM disk (not shown), or, to read from or write to other high capacity optical media such as the DVD). The HDD 313 can be configured for external use in a suitable chassis (not shown). The HDD 313 and ODD 314 can be connected to the system bus 305 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The HDD 313 and/or ODD 314, and their associated computer-readable media, can provide nonvolatile storage of data, data structures, computer-executable instructions, and the like. The HDD 313 and/or ODD 314 can accommodate the storage of any data in a suitable digital format. The storage 312, HDD 313, and/or ODD 314 can include one or more apps that are used to execute aspects of the architecture described herein.

A number of program modules can be stored in the HDD 313, ODD 314, and/or RAM 312B, including an operating system (not shown), one or more application programs (not shown), one or more application programming interfaces (APIs), other program modules (not shown), and program data (not shown). Any (or all) of the operating system, application programs, APIs, program modules, and program data can be cached in the RAM 312B as executable sections of computer code.

The controller 310 can include a network interface 315. The network interface 315 can be connected to the network (not shown). The network interface 315 can include a wired or a wireless communication network interface (not shown) and/or a modem (not shown). When used in a local area network (LAN), the base station computer 300 can be connected to the LAN network through the wired and/or wireless communication network interface; and, when used in a wide area network (WAN), the base station computer 300 can be connected to the WAN network through the modem. The network (not shown) can include a LAN, a WAN, or the like. The modem (not shown) can be internal or external and wired or wireless. The modem can be connected to the system bus 305 via, for example, a serial port interface (not shown).

The controller 310 can include the input/output (I/O) interface 316. The controller 310 can receive commands and data from an operator via the I/O interface 316, which can be communicatively coupled to one or more input/output devices, including, for example, a keyboard (not shown), a mouse (not shown), a pointer (not shown), a microphone (not shown), a speaker (not shown), a display (not shown), and/or the like. The received command and data can be forward to the processor 311 from the I/O interface 316 as instruction and data signals via the bus 305.

The platform sensor interface 320 can be connected to the system bus 305 and the base level sensor 220 (shown in FIG. 3) by means of a communication link. The platform sensor interface 320 can be configured to receive sensor signals from the base level sensor 220, which can indicate the position of the base level sensor 220 in the x-, y-, z-coordinate system (or r, θ, and φ spherical coordinate system) with respect to the gravity vector GV. The position sensor signals can be received in real-time.

The leg actuator driver 330 can be connected to the system bus 305 and the leg actuator(s) (not shown) by means of a communication link. The leg actuator driver 330 can be configured to communicate with and drive each leg actuator (not shown) to thereby align the base 201 and/or platform 2010 based on the position signals received from the base level sensor 220 via the platform sensor interface 320.

The leveling base sensor interface 340 can be connected to the system bus 305 and the beam level sensor 230 (shown in FIG. 3) by means of a communication link. The leveling base sensor interface 340 can be configured to receive position signals from the beam level sensor 230, which can indicate the position of the beam level sensor 230 in the x, y, z-coordinate system (or r, θ, and φ spherical coordinate system) with respect to the gravity vector GV. The sensor position signals can be received in real-time.

The leveling base driver 350 can be connected to the system bus 305 and the beam leveling base 250 (shown in FIG. 3) by means of a communication link. The leveling base driver 350 can be configured to communicate with and drive the beam leveling base 250 to thereby move and align the beam source 210 (and/or beam 110) based on the sensor position signals received from the beam level sensor 230 via the leveling base sensor interface 340.

The position sensor interface 360 can be connected to the system bus 305 and the position sensor 108 (shown in FIG. 2) by means of a communication link. The position sensor interface 360 can be configured to receive sensor position signals from the position sensor 108, which can indicate the position of the beam 110 with respect to the position sensor 108 in the x, y, z-coordinate system (or r, θ, and φ spherical coordinate system). The sensor position signals can be received in real-time.

The beam source driver 370 can be connected to the system bus 305 and the beam source 210 by means of a communication link. The beam source driver 370 can be configured to communicate with and drive the beam source 210 to thereby power, turn ON/OFF or adjust the beam 110, including adjustment of beam intensity, beam angle, beam spread, and the like.

Rather than actuating the base station 200 completely, by recording tilt or misalignment of the beam source 210 optical components (not shown), the base station computer 300 can mathematically correct and/or compensate the data received from the various sensors and components in the base station 200, instead of (or in addition to) actively/physically moving (correcting) the physical components of the base station 200. This implementation can be used to simplify the mechanical system of the base station 200.

The placement of the position sensor 108 can be controlled by the base station computer 300. The placement of the position sensor 108 can occur automatically if it is actuated to move along the surface of the tank wall 112 and is already on the desired surface. The location of the position sensor 108 relative to the base station 200 can be detected and driven to move into a desired position above the base station 200. For example, if the base station 200 moves to the right (or left) by a specific distance, the base station computer 300 can transmit a command signal to the trolley 104 and/or position sensor 108 to do likewise until it is detected that the position sensor 108 is aligned with the base station 200. In this regard, alignment can be determined based on the location of the reference beam 110 with respect the position sensor 108.

The base station computer 300 can be pre-programmed with a set of instructions or computer code to perform a series of measurements, which can be repeated. The repeated measurements could be modifiable to adjust to different specific cases, such as the number of vertical stations V for a given size tank, along with the distances need to move between each station, and the like.

Furthermore, the base station computer 300 can be configured to drive the trolley 104 and/or position sensor 108 and/or the base station 200, so as to cause any or all of them to move with respect to the tank wall 112 being measured.

The base station computer 300 can include a global positioning satellite (GPS) receiver or some other form of localization sensor (such as, for example, using triangulation of WiFi transceivers) to record the absolute/geological coordinates of measurement.

Any one or more of the sensors 108, 220, and 230 can include a GPS receiver or some other form of localization sensor (such as, for example, using triangulation of WiFi transceivers) to record the absolute/geological coordinates of the sensor(s) and/or in order to capture their relative positions.

The base station 200 can be configured to emit a complete 360-degree "plane" in a horizontal or vertical direction that could be received by multiple sensors (not shown) simultaneously. This configuration can be useful for calibrating offsets of the floor of a tank, or other larger surfaces that need to be level.

If the position sensor 108 includes a plurality of sensors positioned at different distances, alignment of the reference beam 110 with respect to these can be accomplished by noting differences in where the reference beam 110 is hitting each position sensor 108 and adjusting either the position sensor(s) 108 or base station 200 to ensure that the reference beam(s) 110 hits (or impinges) each of these position sensors 108 at the same location (assuming that they are all offset from the surface by the same amount). Determining whether to adjust the position sensor 108 orientation or the base station 200 orientation can include analysis of additional data.

The calibration system of the base station 200 and position sensor 108 can include an external tracking system (not shown) to track the location of the position sensor 108 and/or base station 200 in 3D space. For instance, the system can include a lidar-based tracker (not shown) or the like. In this regard, the system can provide a location tag for every offset measurement in 3D space, which could aid the analysis of the data, as well as the alignment of the base station 200 (and carrying vehicle (not shown)).

Figure 5:
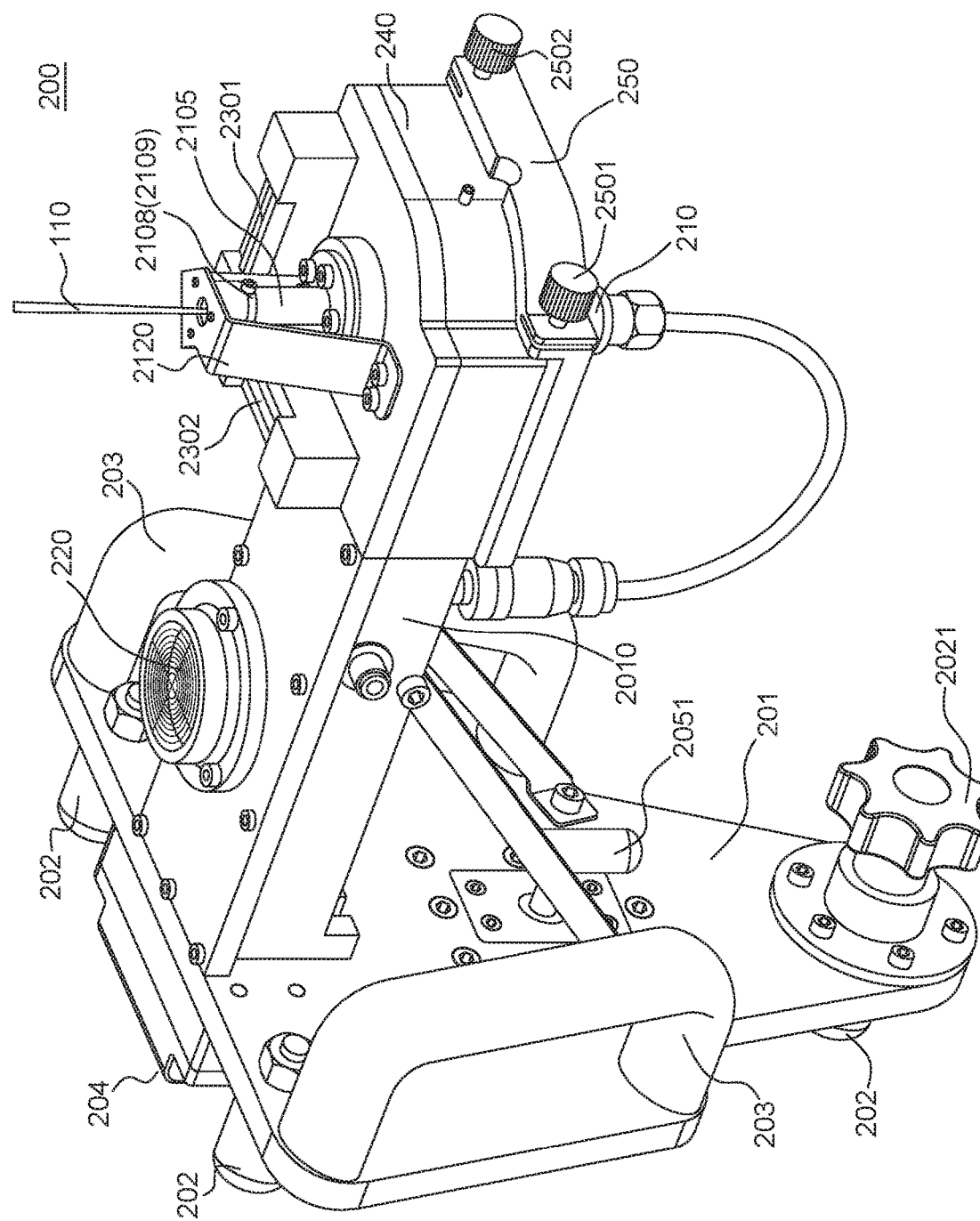
FIGS. 5 and 6 show perspective views of another embodiment of the base station according to principles of the disclosure, with FIG. 6 showing a partially cut-away view of the base station of FIG. 5.
Figure 6:
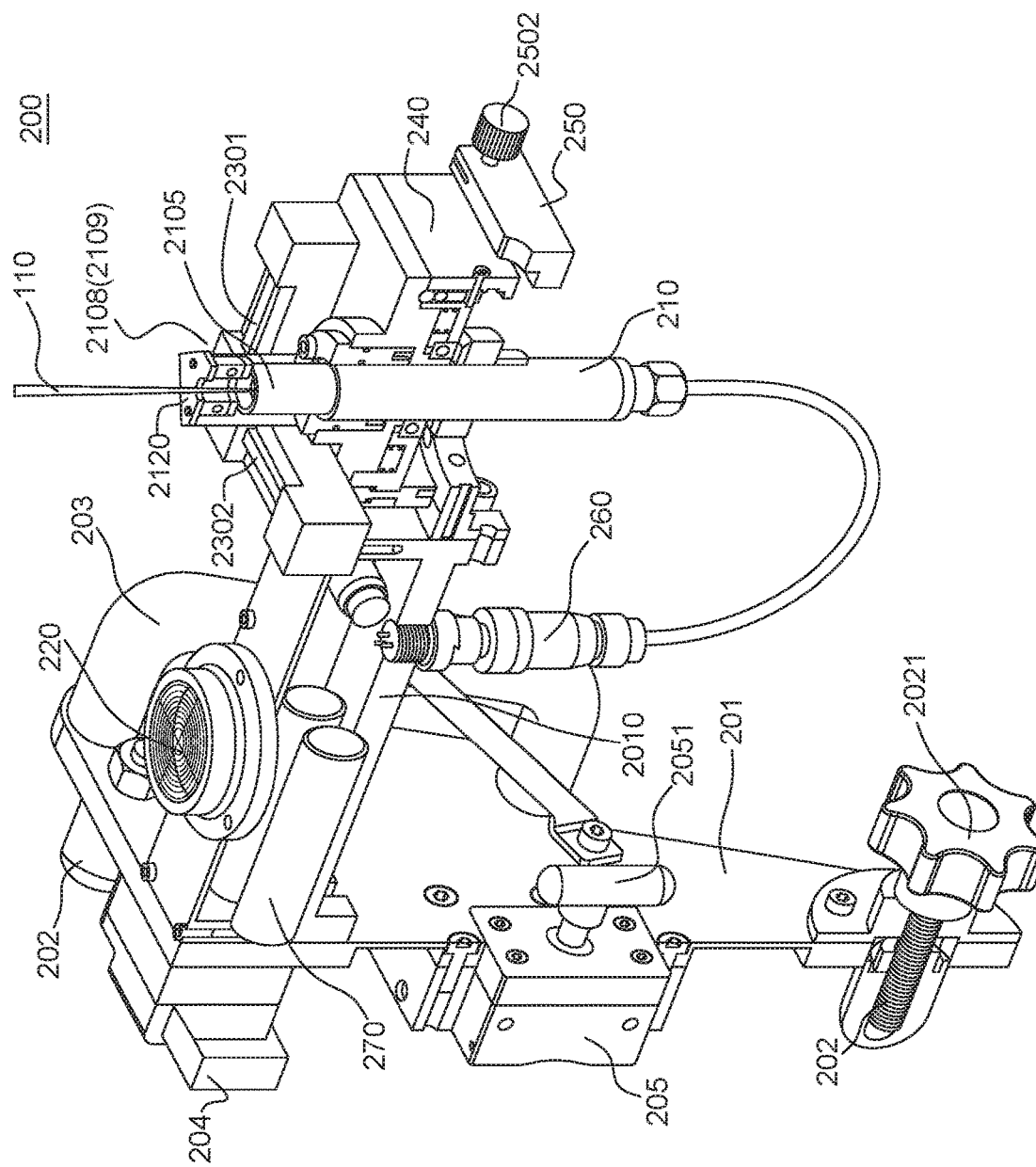

FIGS. 5 and 6 show perspective views of another embodiment of the base station 200, constructed according to the principles of the disclosure. FIG. 6 shows a partially cut-away view of the base station 200 of FIG. 5.

Referring to FIGS. 5 and 6, the base station 200 comprises a base 201, a beam source 210, a three-dimension (3D) base level sensor 220, a plurality (e.g., two) two-dimensional (2D) beam level sensors 2301, 2302 (or 230 collectively), a beam support base 240, a beam leveling base 250, a beam source driver 260, and a power source 270.

The beam source 210 has a beam emitting end 2105 that can be coupled to or integrally formed with a miniature rotary stage 2108 that can be adjusted by an adjustable knob 2109 to adjust (e.g., angle and/or spread) or steer the reference beam 110. The rotary stage 2108 can be adapted for about 2 arcsec sensitivity laser beam steering. The beam source 210 can be coupled to the beam source driver 260 by means of an IP67 or similar connector.

The base 201 includes a plurality of legs 202 (e.g., three legs), a pair of handles 203, a permanent magnet 204, and a controllable magnet 205 that can be controlled by operation of a magnet actuator 2051. In this embodiment, only one of the legs 202 is adjustable.

The leg(s) 202 can be made of a durable lightweight material such as, for example, metal, aluminum, plastic, carbon fiber, or the like. The leg(s) 202 can be adjustable by means of a leg adjuster 2021. The leg adjuster 2021 can include a knob, a handle, or any other device that is capable of controllably extending or retracting the leg(s) 202 with regard to the base 201, so as to properly position and align the base 201 with respect to the tank wall. The leg(s) 202 can be configured to tilt the base 201 by +/−1° for each 6.6 mm of travel. Other leg travel to base tilt ratios are contemplated herein, including tilting the base 201 with respect to the tank wall 112 by less or more than 1° based on travel of less or more than 6.6 mm by the leg 202.

The handle(s) 203 can be made of the same or a different durable lightweight material than the leg(s) 202. The handles 203 are designed to be easily grasped by each hand of the operator, allowing the operator to carry, maneuver and position the base 201 to a desired location on or proximate to a tank wall 112, or a robot (not shown) that can travel along the tank wall 112.

The permanent magnet 204 can include a permanent magnet that exerts, for example, about 44 Kgf max force and/or about 17 Kgf effective force. The permanent magnet can exert max forces greater (or less than) 44 Kgf and effective forces greater (or less than) 17 Kgf.

The controllable magnet 205 can include an electromagnet, which can be controlled by operation of the magnet actuator 2051. The magnet 205 can be turned ON/OFF or its magnetic field adjusted by operation of the magnet actuator 2051, which can include a handle that can be grasped and manipulated by the operator. The magnetic field generated by the magnet 205 can be turned ON/OFF or adjusted by operation of the actuator 2051. The magnet 205 can be powered by the power source 270, which can include an electrical power store such as a battery (e.g., LiFePO4, 6.4V, 9.6 Wh battery). The magnet 205 can include an electromagnet that generates, for example, about 75 Kgf max force and/or about 24 Kgf effective force. The magnet 205 can exert max forces greater (or less than) 75 Kgf and effective forces greater (or less than) 24 Kgf.

The 3D (or 3-axis) base level sensor 220 can comprise, for example, a spirit vial level, a circular spirit vial level, a spirit level bubble vial, a tilt sensor, or any other device that is capable of providing feedback on the alignment of the base 201 in the plane normal to the gravity vector.

The 2D beam level sensors 230 can comprise a dual-axis spirit level, a tilt sensor, or any other device that is capable of providing feedback on the alignment of the base 201 normal to the gravity vector. The sensors 230 can provide 4 arcsec sensitivity.

The beam support base 240 can be mechanically coupled to the beam leveling base 250 and hold the 2D level sensors 230 and the beam source driver 260. The beam leveling base 250 can include a dual-axis leveling base with a range of about +/−2.5° and 2 arcsec sensitivity. The beam leveling base 250 can include a plurality (e.g., two) of adjustable knobs 2501, 2502 to adjust the normal plane of the beam leveling base 250 with respect to the gravity vector. For instance, the knobs 2501, 2502 can be adjusted to center the 2D beam level sensors 230 (e.g., by bringing the bubbles in the spirit vials to the centers of each of the 2D sensors 2301 and 2302).

Figure 7:
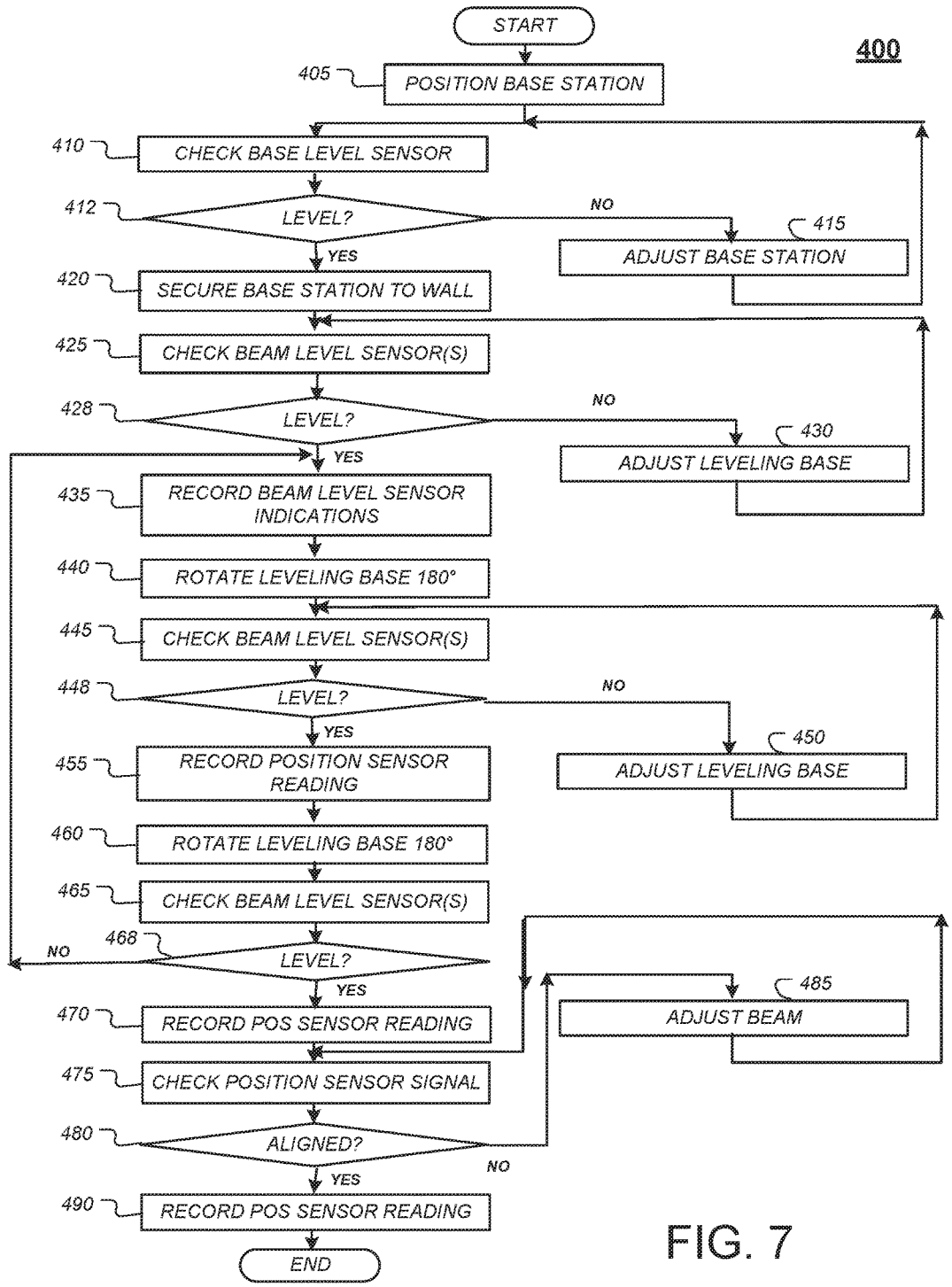
FIG. 7 shows a process for setting up and operating a base station according to an embodiment of the disclosure.

FIG. 7 shows a process 400 for setting up and operating the base station 200 (shown in FIGS. 5-6) according to an embodiment of the disclosure. As noted previously, the base station computer 300 (shown in FIG. 4) can comprise sections of computer code (or instructions) to carry the Steps shown in FIG. 7.

Referring to FIGS. 5-7, initially, after making sure the magnet 205 is switched OFF (or disengaged), the handles 203 can be grasped by the operator and the base station 200 positioned at a desired position on or proximate to a tank wall of a tank to be measured (Step 405). The base station 200 should be positioned with the base level sensor 220 facing upward. The base station 200 can then be affixed to a surface of the tank wall 112 by the magnet 204. The magnet 205 should still be disengaged.

Keeping one hand on the base station 200 and not yet engaging the magnet 205, the base level sensor 220 can be checked to make sure the base station 200 is properly aligned with respect to the gravity vector (Step 410) and, if necessary (NO at Step 412), the base station 200 can be adjusted (Step 415) until the base station 200 is in proper alignment (YES at Step 412) with respect to the gravity vector GV. In the case of the embodiment shown in FIGS. 5 and 6, the base level sensor 220 can be visually inspected to make sure the bubble in the circular spirit vial is within a predetermined base level range, such as, for example, about 2.5° from zero (Steps 410, 412). If not (NO at Step 412), then using the handles 203 and/or leg adjuster 2021 the base station 200 can be adjusted (Step 415) to bring the bubble in the spirit vial 220 within the predetermined base level range, for example, about 2.5° from zero (Step 410).

Once it is determined, based on the base level sensor 220, that the base station 200 is properly aligned with respect to the gravity vector GV (YES at Step 412), then magnet 205 can be engaged by, for example, operation of the magnet actuator 2051 to secure the base station 200 to the tank wall 112 (Step 420). After the magnet 205 is engaged (e.g., by turning the magnet actuator 2051 by, for example, about 180°), the operator can release the both handles 203.

After confirming that the base level sensor 220 indicates proper alignment of the base 201 with respect to the gravity vector GV (YES at Step 412), the beam level sensors 230 (2301 and 2302) can be checked (Step 425) and, if necessary (NO at Step 428), the leveling base 250 can be adjusted (Step 430) until the beam level sensors 230 indicate proper alignment of the leveling base 250 (YES at Step 428) (and, therefore, the beam source 210) with respect to the gravity vector GV. In the case of the embodiment in FIGS. 5 and 6, the dual-axis spirit vials 2301 and 2302 can be visually inspected to make sure the bubbles in the vials are within a predetermined beam level range, such as, for example, about 2.5° from zero (Steps 425, 428). If not (NO at Step 428), then using the knobs 2501 and 2502 the beam leveling base 250 can be adjusted (Step 430) to bring the bubbles in the spirit vials 2301 and 2302 within the predetermined beam level range, for example, about 2.5° from zero (Steps 425, 428).

The beam level sensor 230 indications can then be recorded (Step 435) (for example, by recording the bubbles in the spirit vials 2301 and 2302) and the leveling base 250 can be rotated 180° from the first position shown in FIG. 3 to a second, opposite position (not shown) (Step 440). The platform 2010 and beam leveling base 250 can include a rotation locking mechanism (not shown), which can comprise a female receptacle (not shown) on one of the platform 2010 and the beam leveling base 250, such as, for example, a pin hole that receives a male protrusion (not shown) on the other of the platform 2010 and the beam leveling base 250, such as, for example, a pin, ball bearing, or the like, so as to releasably lock the beam leveling base 250 into one or more predetermined positions radially with respect to the platform 2010, including a position where the normal to the surface of the beam leveling base 250 (or a plane substantially parallel to the reference beam 110) is 180° offset radially from the normal of the top surface of the platform 2010.

After the beam leveling base 250 is rotated 180° from its first position (Step 440), the beam level sensor(s) 230 can be checked to make sure the beam leveling base 250 is properly aligned with respect to the gravity vector GV (Step 445) and, if it is determined that it is not (NO at Step 448), then the beam leveling base 250 can be adjusted (Step 450) until the beam level sensors 230 indicate proper alignment with respect to the gravity vector GV (YES at Step 448). In the case of the embodiment in FIGS. 5 and 6, the knobs 2501 and 2502 can be manipulated (Step 450) to adjust the leveling base 250 to bring the bubbles in the spirit vials 2301 and 2302 within a predetermined beam level range, such as, for example, about 2.5° from zero (Steps 445, 448). Each knob 2501, 2502 can be adjusted (Step 450) to cut the distance travelled by each spirit vial bubble in half. Optionally, a set screw (not shown) can be provided on each knob 2501, 2502, so as to lock the knobs 2501, 2502 in place.

A reading of the position sensor 108 (shown in FIG. 2) can be captured and recorded (Step 455). As noted earlier, the position sensor 108 can be provided on a trolley 104 and the location of the trolley 104 can be recorded instead or in addition to the position sensor 108 reading. Then, the beam leveling base 250 can be rotated 180° back to its first position (Step 460). As the beam leveling base 250 is rotated back to its first (or original) position, the beam level sensors 230 should remain relatively static. The beam level sensors 230 should be checked to make certain the beam leveling base 250 is properly aligned with respect to the gravity vector GV (Step 465). In the case of the embodiment in FIGS. 5 and 6, the bubbles in the spirit vials 2301, 2302 should not move by more than a predetermined rotated beam level range, such as, for example, about ½ of a graduation mark (Step 465). If the bubbles move by more than the predetermined rotated beam level range amount, for example, ½ of a graduation mark (NO at Step 468), then Steps 435 to 465 should be repeated.

If the bubbles do not move by more than the predetermined rotated beam level range amount (YES at Step 468), then the new reading of the position sensor 108 (and/or the trolley) should be captured and recorded (Step 470).

After the base level sensor 220 (YES at Step 420) and the beam level sensor 230 (YES at Steps 428, 448 and 468) are confirmed to indicate proper alignment of the platform 2010 and the beam leveling base 250 with respect to the gravity vector GV, the position sensor 108 signal can be checked (Steps 475, 480) and the rotary stage 2108 can be adjusted (Step 485) (e.g., by adjusting the knob 2109) to steer the beam fan of the reference beam 110 until the position sensor 108 (and/or trolley 104) reading is within a predetermined beam position range (Step 480), such as, for example, as close as possible to an average of the two (2) previously recorded readings (YES at Step 480), at which point the position sensor reading can be recorded (Step 490). The beam leveling base 250 can be (optionally) rotated 180° one or more times to further validate the beam level sensors 230 remain static (e.g., the spirit level bubbles in sensors 2301, 2302 remain fixed throughout the rotation), and the position sensor 108 (and/or trolley 104) match before and after each rotation.

A DigiPas DWL-8500xy, for example, can be optionally mounted on top of the beam leveling base 250 and used to verify its level throughout the 180° rotation(s).

An "actuator," as used in this disclosure, means a machine, device, circuit, component, module, or any system of machines, devices, circuits, components, modules, or the like, which are capable of producing a mechanical force, such as, for example, without limitation, a motor, an electrical motor, a hydraulic actuator, a pneumatic actuator, a gear, rack-and-pinion, a magnet, an electroactive material, or the like.

A "communication(s) link," as used in this disclosure, means a wired and/or wireless medium that conveys data or information between at least two points. The wired or wireless medium can include, for example, a metallic conductor link, a radio frequency (RF) communication link, an Infrared (IR) communication link, an optical communication link, or the like, without limitation. The RF communication link can include, for example, WiFi, WiMAX, IEEE 802.11, DECT, 0G, 1G, 2G, 3G, 4G or 5G cellular standards, Bluetooth, or the like. A communication(s) link can include a public switched telephone network (PSTN) line, a voice-over-Internet-Protocol (VoIP) line, a cellular network link, an Internet protocol link, or the like. The Internet protocol can include an application layer (e.g., BGP, DHCP, DNS, FTP, HTTP, IMAP, LDAP, MGCP, NNTP, NTP, POP, ONC/RPC, RTP, RTSP, RIP, SIP, SMTP, SNMP, SSH, Telnet, TLS/SSL, XMPP, or the like), a transport layer (e.g., TCP, UDP, DCCP, SCTP, RSVP, or the like), an Internet layer (e.g., IPv4, IPv6, ICMP, ICMPv6, ECN, IGMP, IPsec, or the like), and a link layer (e.g., ARP, NDP, OSPF, Tunnels (L2TP), PPP, MAC (Ethernet, DSL, ISDN, FDDI, or the like), or the like).

A "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which can be configured to communicate data via a wireless and/or a wired communication medium. These networks can run a variety of protocols not limited to TCP/IP, IRC or HTTP.

A "computer," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, server farms, computer clouds, or the like.

The terms "including," "comprising" and variations thereof, as used in this disclosure, mean "including, but not limited to," unless expressly specified otherwise.

The terms "a," "an," and "the," as used in this disclosure, means "one or more," unless expressly specified otherwise.

Devices that are in communication with each other need not be in continuous communication with each other, unless expressly specified otherwise. In addition, devices that are in communication with each other can communicate directly or indirectly through one or more intermediaries.

Although process steps, method steps, algorithms, or the like, can be described in a sequential order, such processes, methods and algorithms can be configured to work in alternate orders. In other words, any sequence or order of steps that can be described does not necessarily indicate a requirement that the steps be performed in that order. The steps of the processes, methods or algorithms described herein can be performed in any order practical. Further, some steps can be performed simultaneously.

When a single device or article is described herein, it will be readily apparent that more than one device or article can be used in place of a single device or article. Similarly, where more than one device or article is described herein, it will be readily apparent that a single device or article can be used in place of the more than one device or article. The functionality or the features of a device can be alternatively embodied by one or more other devices which are not explicitly described as having such functionality or features.

A "computer-readable medium," as used in this disclosure, means any medium that participates in providing data (for example, instructions) which can be read by a computer. Such a medium can take many forms, including non-volatile media, volatile media, and transmission media. Non-volatile media can include, for example, optical or magnetic disks and other persistent memory. Volatile media can include dynamic random access memory (DRAM). Transmission media can include coaxial cables, copper wire and fiber optics, including the wires that comprise a system bus coupled to the processor. Transmission media can include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, WiFi, WiMAX, IEEE 802.11, DECT, 0G, 1G, 2G, 3G or 4G cellular standards, Bluetooth, or the like.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. A self-calibrating system that aligns a reference beam with a position sensor, the system comprising:
   a base arranged to attach to a surface;
   a platform arranged to attach to the base and to rotate with respect to the base;
   a beam source located on the platform and arranged to generate and emit the reference beam;
   a base level sensor located on the platform and arranged to detect a position of the platform with respect to a gravity vector; and
   a beam level sensor located on the platform and arranged to indicate alignment of the beam source,
   wherein at least one of a beam angle, a beam fan, a beam intensity, and a beam ON/OFF condition of the reference beam is adjustable.

2. The self-calibrating system of claim 1, wherein the base level sensor comprises a three-dimensional sensor.

3. The self-calibrating system of claim 1, the system further comprising a beam support base arranged to fixedly hold the beam source and the beam level sensor.

4. The self-calibrating system of claim 1, wherein the base is arranged to attach to a tank wall.

5. The self-calibrating system of claim 4, the system further comprising a leg that adjusts to vary a space between a first surface of the base and a surface of the tank wall.

6. The self-calibrating system of claim 1, the system further comprising a beam support base that is arranged to hold the beam source.

7. The self-calibrating system of claim 6, wherein the base is arranged to attach to a tank wall and wherein the platform is arranged to be substantially perpendicular to the base.

8. The self-calibrating system of claim 1, the system further comprising a magnet that is arranged to attach to a tank wall or a robot to hold the base in place with respect to the tank wall.

9. The self-calibrating system of claim 8, the system further comprising another magnet that is arranged to selectively turn ON/OFF to secure the base to the tank wall or the robot and prevent movement of the base in at least one plane with respect to the tank wall or the robot.

10. The self-calibrating system of claim 9, wherein said another magnet comprises an electromagnet or a switchable magnet.

11. The self-calibrating system of claim 1, the system further comprising a beam leveling base that is arranged to adjust the reference beam.

12. The self-calibrating system of claim 11, the system further comprising a beam support base arranged to fixedly hold the beam source and to be mechanically or electrically coupled to the beam leveling base, wherein the beam leveling base is arranged to adjust a position of the beam support base.

13. The self-calibrating system of claim 11, wherein the beam leveling base adjusts the reference beam in at least two planes of a real-world coordinate system.

14. The self-calibrating system of claim 11, wherein the base is arranged to attach to a tank wall or a robot, wherein the beam leveling base is arranged to adjust rotationally about an axis that is perpendicular to a surface of the base.

15. The self-calibrating system of claim 11, wherein the platform has a longitudinal axis, and wherein the beam leveling base is arranged to adjust rotationally about said longitudinal axis.

16. The self-calibrating system of claim 15, wherein the beam leveling base is arranged to rotate 0-degree to 180-degree about said longitudinal axis.

17. A method of aligning a base station in a calibration system, where the base station includes a base, a base level sensor, a beam level sensor, a beam leveling base and a platform, wherein the beam level sensor is arranged on the beam leveling base, the method comprising
positioning the base at a desired position on or proximate to a tank wall of a tank to be measured;
checking the base level sensor and adjusting the base until the base is properly aligned with at least one of a position sensor location and a gravity vector;
engaging a magnet to secure the base to the tank wall and prevent the base from moving in at least one plane with respect to the tank wall;
checking the beam level sensor and adjusting the beam leveling base until the beam level sensor indicates proper alignment of the beam leveling base with respect to the gravity vector; and
recording a beam level indication, wherein the platform is arranged to attach to the base and to rotate with respect to the base.

18. The method of claim 17, the method further comprising:
rotating the beam leveling base 180° from a first position.

19. The method of claim 18, the method further comprising:
checking the beam level sensor and adjusting the beam level base until the beam leveling base is aligned parallel to the gravity vector.

20. A method of aligning a base station in a calibration system, where the base station includes a base and at least one of a base level sensor and a beam level sensor, the method comprising:
positioning the base at a desired position on or proximate to a tank wall of a tank to be measured;
checking the base level sensor and adjusting the base until the base is properly aligned with at least one of a position sensor location and a gravity vector;
engaging a magnet to secure the base to the tank wall and prevent the base from moving in at least one plane with respect to the tank wall;
checking the beam level sensor and adjusting a beam leveling base until the beam level sensor indicates proper alignment of the beam leveling base with respect to the gravity vector;
recording a beam level sensor indication;
receiving a sensor signal from a position sensor; and
adjusting at least one of the base and the beam leveling base based on the received sensor signal,
wherein the sensor signal comprises a position signal indicating a location point where a reference beam impinged on the position sensor.

* * * * *